US009735856B2

(12) United States Patent
Cain (10) Patent No.: US 9,735,856 B2
(45) Date of Patent: Aug. 15, 2017

(54) RECEIVING AND TRANSMITTING RADIO FREQUENCY SIGNALS (71) Applicant: BAE SYSTEMS PLC, London (GB)

(72) Inventor: Lawrence Cain, Warton (GB)

(73) Assignee: BAE SYSTEMS PLC, London (GB)

( * ) Notice: Subject to any disclaimer, the term of this patent is extended or adjusted under 35 U.S.C. 154(b) by 19 days.

(21) Appl. No.: 14/901,911

(22) PCT Filed: Jul. 3, 2014

(86) PCT No.: PCT/GB2014/052035
§ 371 (c)(1),
(2) Date: Dec. 29, 2015

(87) PCT Pub. No.: WO2015/001351
PCT Pub. Date: Jan. 8, 2015

(65) Prior Publication Data
US 2016/0323031 A1    Nov. 3, 2016

(30) Foreign Application Priority Data

Jul. 4, 2013  (EP) ................................. 13275156
Jul. 4, 2013  (GB) ............................... 13120142.2

(51) Int. Cl.
H04W 40/16  (2009.01)
H04B 7/185  (2006.01)
(Continued)

(52) U.S. Cl.
CPC ....... H04B 7/18506 (2013.01); H04B 1/1009 (2013.01); H04B 1/401 (2013.01); H04B 7/18508 (2013.01); H04W 72/0453 (2013.01)

(58) Field of Classification Search
None
See application file for complete search history.

(56) References Cited

U.S. PATENT DOCUMENTS 6,018,659 A * 1/2000 Ayyagari ........... H04B 7/18504
                                               342/450
6,151,354 A * 11/2000 Abbey ................. H04B 7/1851
                                               375/211

(Continued)

FOREIGN PATENT DOCUMENTS

JP   2007243765 A   9/2007
WO   2012101679 A1  8/2012
WO   2013101467 A1  7/2013

OTHER PUBLICATIONS

3GPP Technical Report 36.816 vol. 0.2.0 (Oct. 2010) Study on signalling and procedure for interference avoidance for in-device coexistence, whole document, webpage http://www.3gpp.org/dynareport/36816.htm, downloaded Feb. 12, 2016.

(Continued)

Primary Examiner — Jay P Patel
(74) Attorney, Agent, or Firm — Maine Cernota & Rardin (57) ABSTRACT Disclosed are apparatus and a method for receiving and transmitting radio frequency signals by a vehicle (8). The method comprises: providing a transceiver module (28), the transceiver module (28) being located on board the vehicle (8) and comprising a plurality of transceivers (40-56), each transceiver (40-56) being configured to operate within a different respective radio frequency band; receiving, by a first transceiver, a first radio frequency signal having a first frequency and a first waveform; determining, using the first frequency and first waveform, by a communications management module (36) located on board the vehicle (8), a second frequency and a second waveform, the second frequency being in a different frequency band than the first radio frequency signal, the second waveform being different to the first waveform; and transmitting, by a second transceiver, a second radio frequency signal having the second frequency and the second waveform.

12 Claims, 6 Drawing Sheets (51) Int. Cl.
*H04B 1/10* (2006.01)
*H04B 1/401* (2015.01)
*H04W 72/04* (2009.01)

(56) References Cited

U.S. PATENT DOCUMENTS

| | | |
|---|---|---|
| 7,146,147 B1 | 12/2006 | Sabatino |
| 7,408,898 B1* | 8/2008 | Brown ............... H04B 7/18515 370/250 |
| 2005/0021202 A1* | 1/2005 | Russell ................. G01C 11/02 348/143 |
| 2008/0238807 A1* | 10/2008 | Ibrahim ................ H01Q 21/29 343/876 |
| 2009/0168713 A1 | 7/2009 | Shao et al. |
| 2009/0310530 A1* | 12/2009 | Cerra, II ............ H04B 7/18508 370/316 |
| 2010/0008317 A1* | 1/2010 | Bhattad ................ H04L 1/0003 370/329 |
| 2011/0123028 A1* | 5/2011 | Karabinis ................ H04B 1/69 380/270 |
| 2011/0283001 A1 | 11/2011 | Jung et al. |
| 2012/0069766 A1 | 3/2012 | Fu et al. |
| 2013/0184020 A1 | 7/2013 | Hoshihara et al. |
| 2013/0201050 A1* | 8/2013 | Hellsten .................. G01S 7/006 342/21 |
| 2014/0004853 A1* | 1/2014 | Mitchell ............ H04B 7/18506 455/431 |
| 2014/0045420 A1* | 2/2014 | Tong .................. H04B 7/18506 455/12.1 |
| 2014/0241239 A1* | 8/2014 | Chang ................ H04B 7/18506 370/316 |
| 2016/0097851 A1* | 4/2016 | Zhang .................. B64C 39/024 342/22 |

OTHER PUBLICATIONS

International Preliminary Report on Patentability and Written Opinion, date of issuance Jan. 5, 2016 of Patent Application No. PCT/GB2014/052035 filed Jul. 3, 2014, 9 pages.

EP Search Report dated Nov. 13, 2013 of Patent Application No. EP13275156.1, 5 pages.

GB Search Report dated Dec. 11, 2013 of Patent Application No. GB1312014.2, 6 pages.

* cited by examiner

RECEIVING AND TRANSMITTING RADIO FREQUENCY SIGNALS

RELATED APPLICATIONS

This application is a national phase application filed under 35 USC §371 of PCT Application No. PCT/GB2014/052035 with an International filing date of 3 Jul. 2014 which claims priority of GB Patent Application 1312014.2 filed 4 Jul. 2013 and EP Patent Application 13275156.1 filed 4 Jul. 2013. Each of these applications is herein incorporated by reference in their entirety for all purposes.

FIELD OF THE INVENTION

The present invention relates to the receiving and transmission of radio frequency signals by vehicles.

BACKGROUND

Typically, reliable communications facilitate the effective operation of some systems. For example, radio communication between an aircraft and a base on the ground facilitate for safe operation of the aircraft and mission success.

Many aircraft utilise a number of communication and data link systems to enable them to carry out their missions. Typically, these systems are connected to one or more dedicated antennas. The proximity of these antennas to each other, especially on an aircraft with space restrictions, can create a phenomenon known as "co-site" interference.

Serious problems can occur when a transmitter antenna is located within the vicinity of a receiver antenna. In particular, weak or distant signals that a receiver is normally capable of receiving may be lost in the low-level broadband noise created by a co-site transmitter. This effect is referred to as "receiver desensitisation".

One solution to the problem of receiver desensitisation is to increase antenna RF isolation by increasing the spatial separation of receiving and transmitting antennas. However, this is not always possible on platforms which are of limited size, especially Low-Observable (LO) aircraft.

SUMMARY OF THE INVENTION

In a first aspect, the present invention provides a method of receiving and transmitting radio frequency signals by a vehicle (e.g. a manned or unmanned aircraft). The method comprises: providing a transceiver module, the transceiver module being located onboard the vehicle, the transceiver module comprising a plurality of transceivers, each transceiver being configured to operate within a different respective radio frequency band; receiving, by a first transceiver of the transceiver module, a first radio frequency signal having a first frequency and a first waveform, the first frequency being a frequency within a first radio frequency band, the first radio frequency band being a band within which the first transceiver is configured to operate; determining, using the frequency and a waveform of the first radio frequency signal, by a communications management module located onboard the vehicle and operatively coupled to the transceiver module, a second frequency and a second waveform, the second frequency being a frequency within a second radio frequency band, the second radio frequency band being different to the first radio frequency band, the second waveform being different to the first waveform; and transmitting, by a second transceiver of the transceiver module, a second radio frequency signal, the second radio frequency signal having the second frequency and the second waveform. The second radio frequency band is a band within which the second transceiver is configured to operate.

In some aspects, the first radio frequency band does not overlap to any extent with the second radio frequency band. Thus, the second radio frequency signal is not received by the first transceiver.

The step of transmitting and the step of receiving may overlap at least to some extent tomporally.

The method may further comprise, prior to the step of transmitting: acquiring, by a waveform synthesiser, a waveform specification for the second waveform; and synthesising, using the acquired waveform specification, by the waveform synthesiser, the second radio frequency signal.

The waveform specification may be acquired from a waveform library. The waveform library may be located onboard the vehicle. The waveform library may contain one or more different waveform specifications.

Determining the second waveform may comprise selecting, from the waveform library, a waveform specification that is capable of being synthesised by the waveform synthesiser, specifies a waveform that is different to the first waveform, and is capable of being transmitted by the second transceiver.

The first transceiver may receive the first radio frequency signal via a receiver antenna. The method may further comprise selecting, by the communications management module, as a transmission antenna, an antenna that is a different antenna to the receiver antenna. The step of transmitting the second radio frequency signal may be performed via the transmission antenna. The receiver antenna and the transmission antenna may be located onboard the vehicle.

The first transceiver may receive the first radio frequency signal via a receiver antenna. The second transceiver may transmit the second radio frequency signal via a transmission antenna. The receiver antenna and the transmission antenna may be are located onboard the vehicle. The receiver antenna may be the same antenna as the transmission antenna.

The method may further comprise: receiving, by a third transceiver of the transceiver module, a third radio frequency signal; and controlling, so as to reduce interference in the received third radio frequency signal caused by the transmission of the second radio frequency signal, by a control module, an operation of one or more entities selected from a group of entities consisting of: the second transceiver, the third transceiver, and an antenna from which the second radio frequency signal is being transmitted. This antenna may be located onboard the vehicle.

The step of controlling may comprise controlling the apparatus so as to reduce a sensitivity to the second radio frequency signal of the third transceiver. The step of controlling may comprise controlling the apparatus so as to reduce a sensitivity to the second radio frequency signal of an antenna at which the third radio frequency signal is received. The step of controlling may comprise controlling the apparatus so as to reduce a transmit power with which the second radio frequency signal is transmitted. The step of controlling may comprise controlling the apparatus so as to steer the antenna from which the second radio frequency signal is transmitted so that the second radio frequency signal is directed away from the antenna at which the third radio frequency signal is received.

The method may further comprise: transmitting, by a fourth transceiver of the transceiver module, a fourth radio frequency signal; and controlling, so as to reduce interference between the second radio frequency signal and the fourth radio frequency signal, by a control module, an operation of one or more entities selected from a group of entities consisting of: the second transceiver, the fourth transceiver, an antenna from which the second radio frequency signal is being transmitted, and an antenna (20, 22, 24) from which the fourth radio frequency signal is being transmitted. This step of controlling may be performed such that the transmission of the second radio frequency signal and the transmission of the fourth radio frequency signal do not overlap to any extent temporally.

In a further aspect, the present invention provides apparatus for receiving and transmitting radio frequency signals. The apparatus is located onboard a vehicle. The apparatus comprises: a transceiver module comprising a plurality of transceivers. Each transceiver is configured to operate within a different respective radio frequency band. The apparatus further comprises a communications management module operatively coupled to the transceiver module. A first transceiver of the transceiver module is configured to receive a first radio frequency signal having a first frequency and a first waveform, the first frequency being a frequency within a radio frequency band within which the first transceiver is configured to operate. The communications management module is configured to determine, using the frequency and a waveform of the first radio frequency signal, a second frequency and a second waveform, the second frequency being a frequency within a second radio frequency band, the second radio frequency band being different to the first radio frequency band, and the second waveform being different to the first waveform. A second transceiver of the transceiver module is configured to transmit a second radio frequency signal, the second radio frequency signal having the second frequency and the second waveform. The second radio frequency band is a band within which the second transceiver is configured to operate.

In a further aspect, the present invention provides a program or plurality of programs arranged such that when executed by a computer system or one or more processors it/they cause the computer system or the one or more processors to operate in accordance with the method of any of the above aspects.

In a further aspect, the present invention provides a machine readable storage medium storing a program or at least one of the plurality of programs according to the preceding aspect.

In a further aspect, the present invention provides a method of receiving and transmitting radio frequency signals by a vehicle. The method comprises: providing a transceiver module located onboard the vehicle and comprising a plurality of transceivers, each transceiver being configured to operate within a different respective radio frequency band; providing a waveform library located onboard the vehicle and containing a plurality of different waveform specifications; receiving, by a first transceiver of the transceiver module, a first radio frequency signal having a first frequency and a first waveform (the first frequency is a frequency within a first radio frequency band and the first radio frequency band is a band within which the first transceiver is configured to operate); determining, using the first frequency, by a communications management module located onboard the vehicle, a second frequency (the second frequency is different to the first frequency and is within a second radio frequency band that is different to the first radio frequency band); selecting, using the first waveform, by the communications management module, a second waveform corresponding to one of the plurality of waveform specifications stored in the waveform library (the second waveform is different to the first waveform); acquiring, by a waveform synthesiser, from the waveform library, a waveform specification for the second waveform; synthesising, by the waveform synthesiser using the acquired waveform specification for the second waveform, a signal having the second frequency and the second waveform; and transmitting, by a second transceiver of the transceiver module configured to operate within the second radio frequency band, the synthesised signal.

In a further aspect, the present invention provides apparatus for receiving and transmitting radio frequency signals by a vehicle. The apparatus is located onboard the vehicle. The apparatus comprises: a transceiver module comprising a plurality of transceivers, each transceiver being configured to operate within a different respective radio frequency band; a waveform library containing a plurality of different waveform specifications; a communications management module; and a waveform synthesiser. A first transceiver of the transceiver module is configured to receive a first radio frequency signal having a first frequency and a first waveform, the first frequency being a frequency within a first radio frequency band, the first radio frequency band being a band within which the first transceiver is configured to operate. The communications management module is configured to: determine, using the first frequency, a second frequency, the second frequency being different to the first frequency and being within a second radio frequency band that is different to the first radio frequency band; and select, using the first waveform, a second waveform corresponding to one of the plurality of waveform specifications stored in the waveform library, the second waveform being different to the first waveform. The waveform synthesiser is configured to acquire, from the waveform library, a waveform specification for the second waveform, and to synthesise, using the acquired waveform specification for the second waveform, a signal having the second frequency and the second waveform. A second transceiver of the transceiver module is configured to operate within the second radio frequency band, and to transmit the synthesised signal.

In a further aspect, the present invention provides an aircraft comprising apparatus according to any of the preceding aspects.

In a further aspect, the present invention provides a method of controlling apparatus. The apparatus is located onboard a vehicle. The apparatus comprises a transceiver module and one or more antennas operatively coupled to the transceiver module. The transceiver module comprises a plurality of transceivers, each transceiver being configured to operate within a respective radio frequency band. The method comprises: transmitting, by a first transceiver of the transceiver module, a first radio frequency signal having a first frequency and a first waveform, the first frequency being a frequency within a radio frequency band within which the first transceiver is configured to operate; acquiring, by a control module operatively coupled to the apparatus and located onboard the vehicle, the frequency and/or waveform of the first radio frequency signal; and, using the acquired information, controlling, by the control module, at least part of the apparatus so as to reduce interference with the operation of a transceiver of the transceiver module other than the first transceiver caused by the transmission of the first radio frequency signal.

The method may further comprise transmitting, by a second transceiver of the transceiver module, a second radio frequency signal.

The radio frequency band within which the first transceiver is configured to operate may overlap at least to some extent with the radio frequency band within which the second transceiver is configured to operate.

The step of controlling may comprise controlling one or both of the first transceiver and the second transceiver so that the transmission of the first radio frequency signal and the transmission of the second radio frequency signal do not overlap to any extent temporally.

A frequency of the first radio frequency signal may be equal to a frequency of the second radio frequency signal.

The method may further comprise receiving, by a third transceiver of the transceiver module, a third radio frequency signal.

The steps of transmitting the first radio frequency signal and receiving the third radio frequency signal may overlap at least to some extent temporally.

The step of controlling may comprise controlling the apparatus so as to reduce a sensitivity to the first radio frequency signal of the third transceiver. The step of controlling may comprise controlling the apparatus so as to reduce a sensitivity to the first radio frequency signal of an antenna at which the third radio frequency signal is received. The step of controlling may comprise controlling the apparatus so as to reduce a transmit power with which the first radio frequency signal is transmitted. The step of controlling may comprise controlling the apparatus so as to steer an antenna from which the first radio frequency signal is transmitted so that the first radio frequency signal is directed away from an antenna at which the third radio frequency signal is received.

The apparatus may comprise at least two antennas. The method may further comprise receiving, by a fourth transceiver of the transceiver module, a fourth radio frequency signal, the fourth radio frequency signal being received at one of the antennas. The step of transmitting may comprise, in response to receiving the fourth radio frequency signal, selecting, as an antenna from which the first radio frequency signal is to be transmitted, an antenna that is a different antenna to the antenna at which the fourth radio frequency signal is received, and thereafter transmitting, by the first transceiver, from the selected antenna, the first radio frequency signal.

The step of selecting an antenna from which the first radio frequency signal is to be transmitted may comprise selecting an antenna that is spatially separated from the antenna at which the fourth radio frequency signal is received.

The method may further comprise: receiving, by a fifth transceiver of the transceiver module, a fifth radio frequency signal; determining, using a frequency of the fifth radio frequency signal, by a communications management module located onboard the vehicle, the first frequency for the first radio frequency signal. The first frequency may be different to the frequency of the fifth radio frequency signal (e.g. the first frequency may be in a different radio frequency band to the frequency of the fifth radio frequency signal).

The method may further comprise determining, using a waveform of the fifth radio frequency signal, by the communications management module, a waveform for the first radio frequency signal, the waveform for the first radio frequency signal being different to the waveform of the fifth radio frequency so signal. The first radio frequency signal may then be transmitted using the determined waveform for the first radio frequency signal.

The apparatus may further comprise a waveform library, the waveform library comprising a plurality of different waveform specifications. The step of transmitting may comprise: selecting a waveform specification from the waveform library; using the selected waveform specification, generating the first radio frequency signal; and transmitting, by the first transceiver, the first radio frequency signal having a waveform specified by the selected waveform specification.

Each of the transceivers may be operatively coupled (e.g. via an optical fibre network) to each of the one or more antennas such that each of the transceivers may transmit and receive a radio frequency signal via each of the one or more antennas.

The vehicle may be an aircraft e.g. an unmanned aircraft.

In a further aspect, the present invention provides a controller for controlling apparatus. The apparatus is located onboard a vehicle. The apparatus comprises a transceiver module and one or more antennas operatively coupled to the transceiver module. The transceiver module comprises a plurality of transceivers, each transceiver being configured to operate within a respective radio frequency band. The controller is configured to: acquire a frequency and/or a waveform of a first radio frequency signal being transmitted by a first transceiver of the transmission module; and, using the acquired information, control at least part of the apparatus so as to reduce interference with the operation of a transceiver of the transceiver module other than the first transceiver caused by the transmission of the first radio frequency signal.

DETAILED DESCRIPTION

Figure 1:
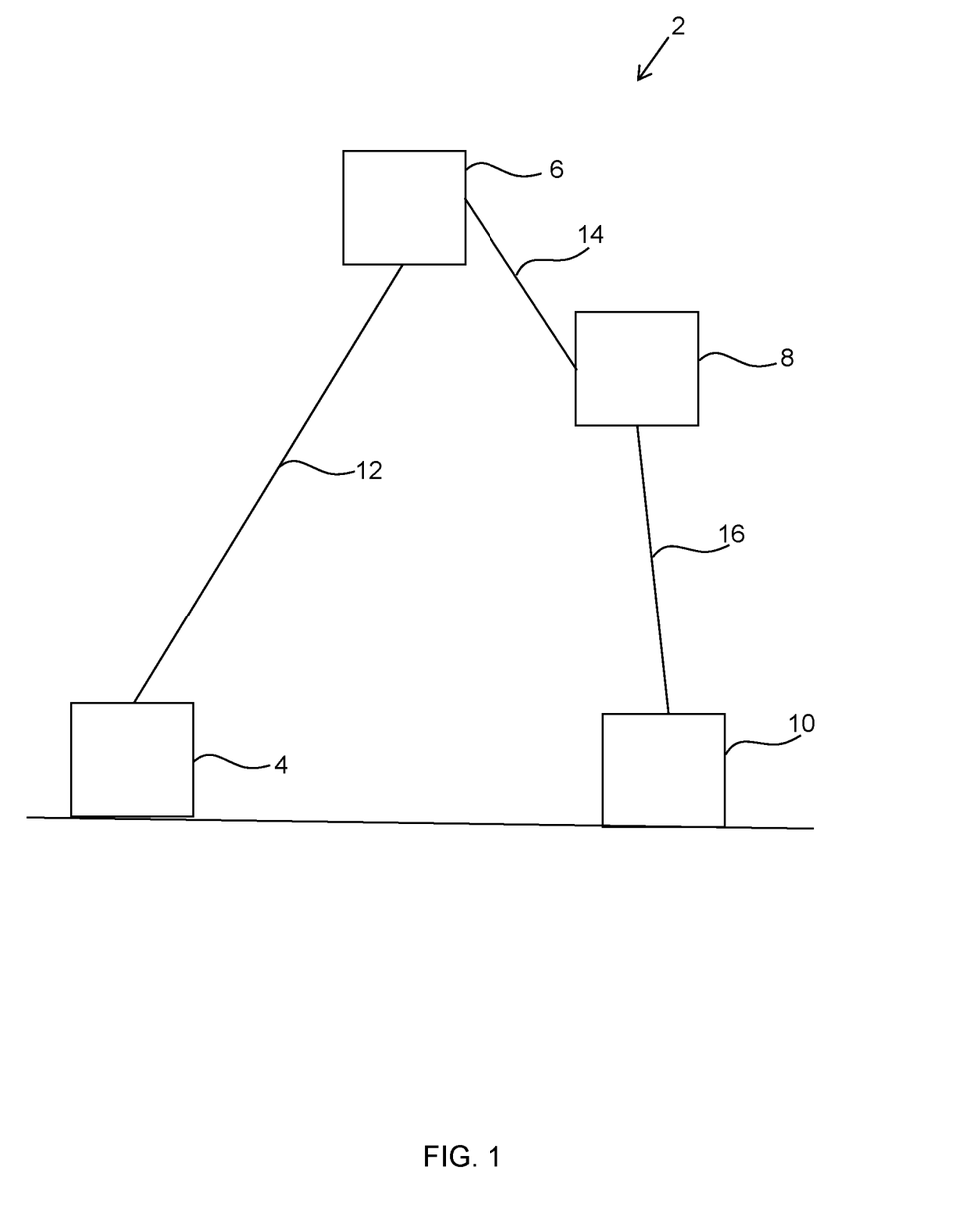
FIG. 1 is a schematic illustration (not to scale) of an example scenario.

FIG. 1 is a schematic illustration (not to scale) of an example scenario 2 in which an embodiment of a method of communication management is implemented.

The scenario 2 comprises a ground station 4, a satellite 6, an unmanned air vehicle (UAV) 8, and an air traffic control (ATC) station 10.

In this scenario 2, the ground station 4 is located on the ground. The ground station 4 is a control station for controlling the UAV 8. For example, a human operator located at the ground station 4 may control the UAV 8 by sending a UAV control signal from the ground station 4 to the UAV 8.

In this scenario 2, the satellite 6 is an artificial communications satellite in a geostationary orbit.

In this scenario 2, the UAV 8 flies above the ground some distance from the ground station 4. The UAV 8 is described in more detail later below with reference to FIG. 2.

In this scenario 2, the ATC station 10 is located on the ground (e.g. at some distance from the ground station 4).

In this scenario 2, the ground station 4 is connected to the satellite 6 via a first communications link 12. The first communications link 12 is a wireless communications link. The first communications link 12 is such that a signal (for example, a UAV control signal for controlling the UAV 8) transmitted by the ground station 4 is received by the satellite 6. Also, the first communications link 12 is such that a signal received by the satellite 6 (for example, from the UAV 8) may be relayed by the satellite 6 to the ground station 4.

In this scenario 2, in addition to being connected to the ground station 4 via the first communications link 12, the satellite 6 is connected to the UAV 8 via a second communications link 14. The second communications link 14 is a wireless communications link. The second communications link 14 is such that a signal received by the satellite 6 (for example, from the ground station 4) may be relayed by the satellite 6 to the UAV 8. Also, the second communications link 14 is such that a signal transmitted by the UAV 8 may be received by the satellite 6.

In this scenario 2, in addition to being connected to the satellite 6 via the second communications link 14, the UAV 8 is connected to the ATC station 10 via a third communications link 16. The third communications link 16 is a wireless communications link. The third communications link 16 is such that a signal transmitted by the UAV 8 may be received by the ATC station 10 and vice versa.

Figure 2:
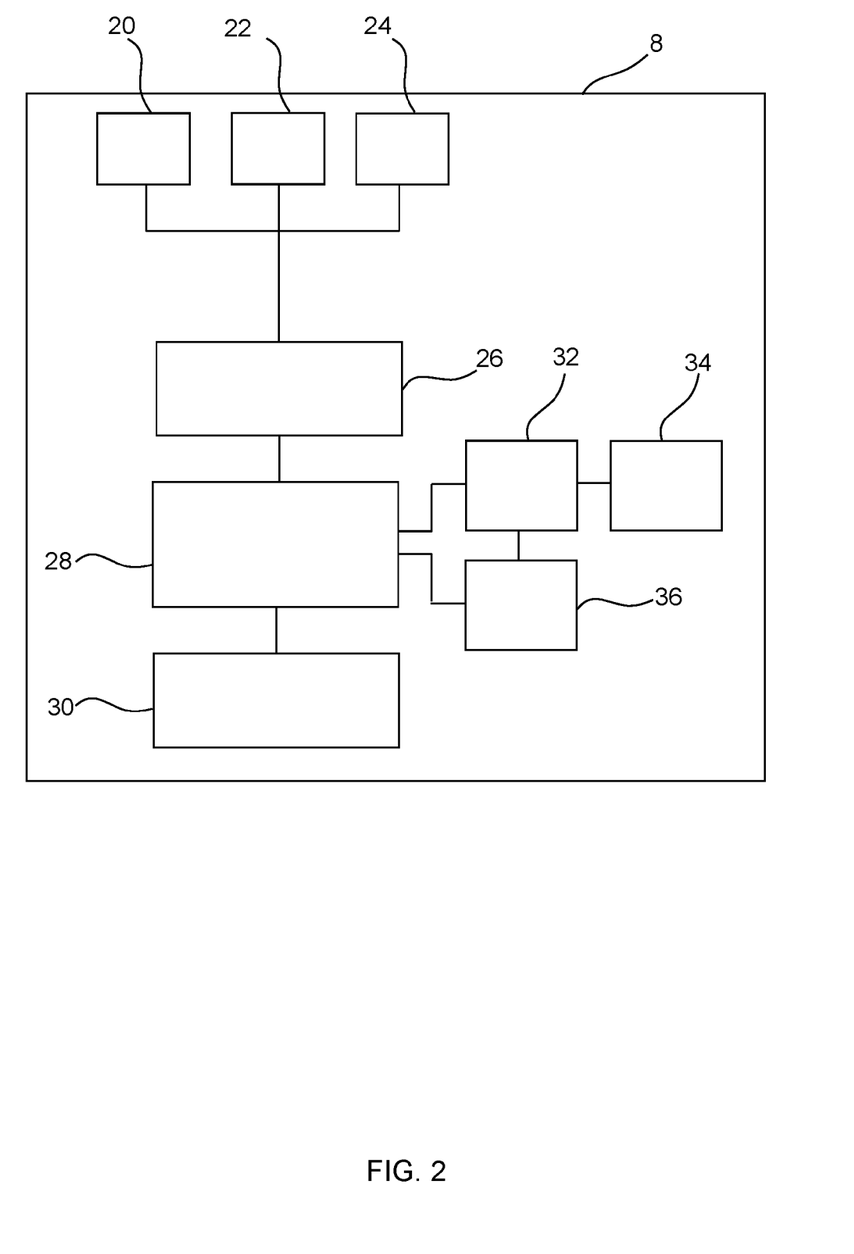
FIG. 2 is a schematic illustration (not to scale) of an unmanned air vehicle.

FIG. 2 is a schematic illustration (not to scale) of the UAV 8.

In this embodiment, the UAV 8 comprises a low frequency (LF) antenna 20, a medium frequency (MF) antenna 22, a high frequency (HF) antenna 24, a distribution module 26, a transceiver module 28, a waveform library 30, a mission system module 32, a sensor module 34, and a communication management module 36.

In this embodiment, the LF antenna 20, the MF antenna 22, and the HF antenna 24 are co-site antennas. In other words, the LF, MF and HF antenna 20, 22, 24 are located close to one another onboard the UAV 8 such that a signal that a receiving antenna is normally capable of receiving may be lost in the low-level broadband noise created by a co-site transmitting antenna. The proximity of the LF, MF and HF antenna 20, 22, 24 to each other can create "co-site" interference problems. In other words, the LF, MF and HF antenna 20, 22, 24 are co-site antennas In this embodiment, each of the LF, MF and HF antennas 20, 22, 24 are capable of acting as a receiver and transmitter antenna.

Each of the LF, MF and HF antenna 20, 22, 24 are connected to the distribution module 26 such that signals may be sent between each of the antennas 20, 22, 24 and the distribution module 26, for example, as described in more detail later below with reference to FIG. 6.

In this embodiment, in addition to being connected to each of the antennas 20, 22, 24, the distribution module 26 is connected to the transceiver module 28 such that a signal may be sent between the distribution module 26 and the transceiver module 28.

In some embodiments, the distribution module 26 provides a simplex data path between each of the antennas 20, 22, 24 and a plurality of transceivers in the transceiver module 28 (which are described in more detail later below with reference to FIG. 3).

In other embodiments, the distribution module 26 is, in effect, a duplexer that connects each of the antennas 20, 22, 24 with each of the plurality of transceivers in the transceiver module 28. In other words, the connection between the antennas 20, 22, 24 and the transceiver module 28, provided by the distribution module 26, may be such that bi-directional (duplex) communication over a single path is provided between each of the antennas 20, 22, 24 and the transceiver module 28. In such embodiments, more than one synthesiser may be utilised to enable full duplex operation. Also, in such embodiments, a frequency offset may be incorporated to reduce co-site interference.

In operation, as described in more detail later below with reference to FIG. 6, the distribution module 26 receives a signal from one or more of the antennas 20, 22, 24. The distribution module 26 comprises one or more optical switches that switch the signal received from an antenna 20, 22, 24 into a laser optical signal, the frequency of which corresponds to a destination for that signal (i.e. a particular transceiver of the transceiver module 28). The distribution module further comprises an optical fibre network via which the optical signal is sent to a relevant transceiver of the transceiver module 28.

Also in operation, as described in more detail later below with reference to FIG. 6, the distribution module 26 receives a signal from one or more of the transceivers of the transceiver module 28. The signal received from a transceiver is sent, as a laser optical signal, via the optical fibre network of the distribution module 26, to the one or more optical switches of the distribution module 26. The one or more optical switches switch the optical signal into a modulated carrier wave, the frequency of which corresponds to a destination for that signal (i.e. a particular antenna 20, 22, 24). The optical switches send the optical signal to a relevant antenna 20, 22, 24 for transmission.

Having an optical fibre network and using optical switches to direct signals through the optical network advantageously tends to reduce vehicle weight and RF losses. The use of lossy mechanical switches may be avoided. Furthermore, beamwidths of the lasers used to produce optical signals may be selected so as to increase separation between the optical channels provided by the optical fibre network. It tends to be possible to provide multiple channels using a single optical fibre without channel crosstalk occurring.

In this embodiment, the distribution module 26 further comprises amplification means for amplifying a signal prior that is received by an antenna 20, 22, 24 and also amplifying a signal prior to that signal being transmitted by an antenna 20, 22, 24.

In this embodiment, the transceiver module 28 comprises a plurality of transceivers. The transceiver module 28 is described in more detail later below with reference to FIGS. 3 and 4.

In addition to being connected to the distribution module 26, the transceiver module 28 is connected to the waveform library 30 such that the transceiver module 28 may acquire information stored within the waveform library 30.

Also, in this embodiment, the transceiver module 28 is connected to the mission system module 32. This connection is such that information may be sent between the transceiver module 28 and the mission system module 32.

Also, in this embodiment, the transceiver module 28 is connected to the communication management module 36. This connection is such that information may be sent between the transceiver module 28 and the communication management module 36.

The waveform library 30 is described in more detail later below with reference to FIG. 5.

In this embodiment, in addition to being connected to the transceiver module 28, the Mission systems module 32 is connected to the sensor module 34. This connection is such that a signal (e.g. a signal for controlling the operation of a sensor of the sensor module 34, or a measurement taken by a sensor of the sensor module 34) may be sent between the mission systems module 32 and the sensor module 34.

Also, in this embodiment, the mission systems module 32 is connected to the communication management module 36. This connection is such that a signal may be sent between the mission systems module 32 and the communication management module 36.

In this embodiment, the mission system module 32 is configured to, in response to receiving a UAV control signal from the transceiver module 28, control operation of one or more systems onboard the UAV 8. For example, in some embodiments, the mission system module 32 controls the operation of the one or more of the sensors within the sensor module 34. Also for example, in some embodiments, the mission system module 32 controls a propulsion system and/or a navigation system of the UAV 8 such that the UAV 8 operates as Specified in a UAV control signal received by the mission systems module 32.

In this embodiment, the sensor module 34 comprises one or more sensors or other apparatus from which measurements may be taken. The sensor module 34 may comprise any appropriate type of sensor or other apparatus from which a measurement or reading may be taken. In particular, in this embodiment the sensor module 34 includes an altimeter, a compass, an airspeed sensor, and a GPS receiver.

Functionality of the communications management module 36 is described in more detail later below with reference to FIG. 6.

Figure 3:
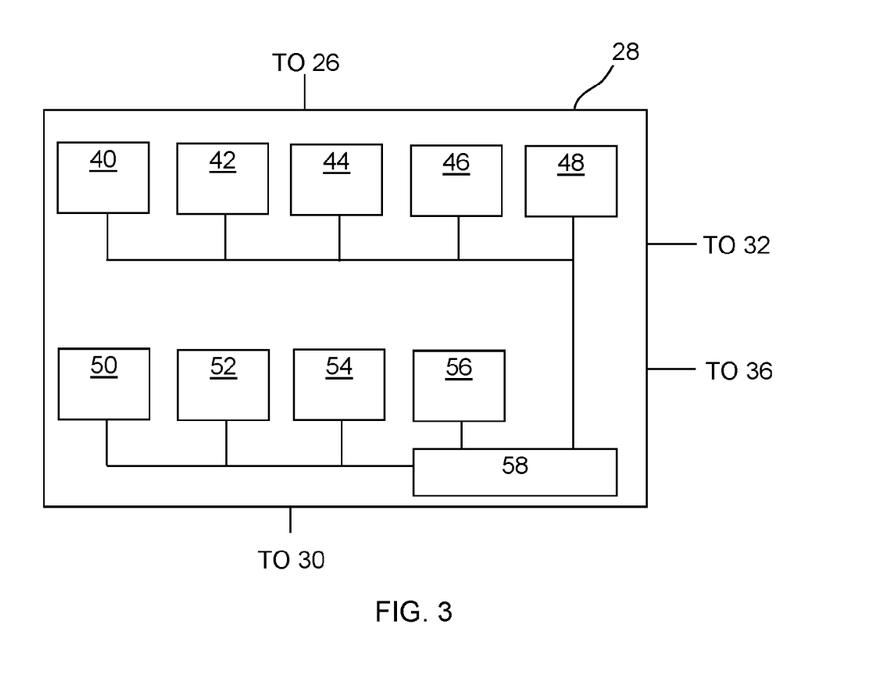
FIG. 3 is a schematic illustration (not to scale) of a transceiver module.

FIG. 3 is a schematic illustration (not to scale) showing the transceiver module 28.

In this embodiment, the transceiver module 28 comprises nine transceivers 40-56 and a transceiver controller 58.

The first transceiver 40 is a radio frequency (RF) transceiver for sending and receiving RF signals in the frequency band 2 MHz-30 MHz. In particular, the first transceiver 40 is a High Frequency (HF) RF transceiver.

The second transceiver 42 is an RF transceiver for sending and receiving RF signals in the frequency band 30 MHz-512 MHz. In particular, the second transceiver 42 is a Very/Ultra High Frequency (V/UHF) RF transceiver.

The third transceiver 44 is an RF transceiver for sending and receiving RF signals in the frequency band 980 MHz-2 GHz. In particular, the third transceiver 44 is an L-band RF transceiver.

The fourth transceiver 46 is an RF transceiver for sending and receiving RF signals in the frequency band 2 GHz-4 GHz. In particular, the fourth transceiver 46 is an S-band RF transceiver.

The fifth transceiver 48 is an RF transceiver for sending and receiving RF signals in the frequency band 4 GHz-8 GHz. In particular, the fifth transceiver 48 is a C-band RF transceiver.

The sixth transceiver 50 is an RF transceiver for sending and receiving RF signals in the frequency band 8 GHz-12 GHz. In particular, the sixth transceiver 50 is an X-band RF transceiver.

The seventh transceiver 52 is an RF transceiver for sending and receiving RF signals in the frequency band 12 GHz-18 GHz. In particular, the seventh transceiver 52 is a Ku-band RF transceiver.

The eighth transceiver 54 is an RF transceiver for sending and receiving RF signals in the frequency band 27 GHz-40 GHz. In particular, the eighth transceiver 54 is a Ka-band RF transceiver.

The ninth transceiver 56 is an RF transceiver for sending and receiving RF signals in the frequency band 58 GHz-60 GHz. In particular, the eighth transceiver 56 is a 60 GHz communications RF transceiver.

In this embodiment, each of the transceivers 40-56 is configured to send and receive a radio frequency signal via a respective radio communication channel, herein referred to as a "communication channel". A communications channel may be thought of as a mode or medium through which information may be transferred from the sender to the receiver. Each different communication is defined by a different band of radio frequencies in which a signal may be sent/received. These different radio frequency bands may be non-overlapping. For example, the radio frequency bands that define the communication channels may be separated from one another by a bandwidth frequency that may be defined by international standards. For example, in this embodiment the first transceiver 40 is for sending and receiving RF signals in a first communication channel defined by the frequency band 2 MHz-30 MHz, and so on.

In other words, in this embodiment each of the transceivers 40-56 is a synthesiser slice configured to operate in a designated band of operation. An operating mode of each synthesiser slice may be changed by up-loading a different operating waveform from the waveform library 30.

In some embodiments, more than one channel may operate simultaneously. In such embodiments, further synthesiser slices may be implemented. As the synthesiser slices are controlled within a common infrastructure, it tends to be possible to reduce co-site interference using frequency separation and cancellation.

In this embodiment, the transceiver controller 58 is connected to each of the transceivers 40-56 such that the transceiver controller 58 may control (using a transceiver control signal) each of the transceivers 40-56. For example, the transceiver controller 58 may control how a signal received by a transceiver 40-56 is filtered by that transceiver 40-56. In this embodiment, the transceiver controller 58 is further connected to the communications management system 36 such that information may be passed between the communications management system 36 and the transceiver controller 58.

By way of example, the first transceiver 40 will now be described. The other transceivers 42-56 comprise components corresponding to those described below for the first transceiver 40. The components of the other transceivers 42-56 are connected together in a corresponding fashion to that described below for the components of the first transceiver 40.

Figure 4:
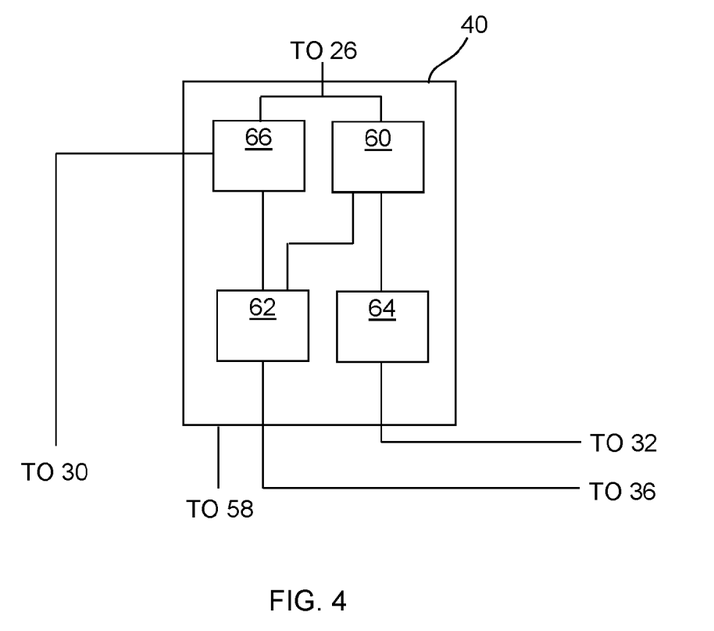
FIG. 4 is a schematic illustration (not to scale) of a transceiver.

FIG. 4 is a schematic illustration (not to scale) showing the first transceiver 40.

In this embodiment, the first transceiver 40 comprises a first demodulator 60, a first data input/output 62, a first control signal input/output 64, and a first waveform synthesiser 66.

In this embodiment, each of the other transceivers 42-56 comprise a respective demodulator, a data input/output, a control signal input/output, and a waveform synthesiser. For example, the second transceiver 42 comprises a second demodulator, a second data input/output, a second control signal input/output, and a second waveform synthesiser. Also, the third transceiver 44 comprises a third demodulator, a third data input/output, a third control signal input/output, and a third waveform synthesiser, and so on.

In this embodiment, the first demodulator 60 is connected to the distribution module 26 such that a signal may be received by the first demodulator 60 from the distribution module 26.

The first demodulator 60 is configured to receive and demodulate High Frequency (HF) RF signals. Similarly, each of the other demodulators (i.e. the demodulator of each of the other transceivers 42-56) is configured to receive and demodulate signals of the relevant type. For example, the second demodulator is configured to receive and demodulate V/UHF RF signals, the third demodulator is configured to receive and demodulate L-band RF signals, and so on.

The first demodulator 60 is further connected to the first data input/output 62 and the first control signal input/output 64. These connections are such that a demodulated signal may be sent, from the first demodulator 60, to either or both of the first data input/output 62 and the first control signal input/output 64. In this embodiment, if the demodulated signal comprises data for use by the communications management module 36 (e.g. data that is to be decoded or encoded, data that is to be relayed by the UAV 8 to an entity that is remote from the UAV 8, data that specifies how and/or in what format a signal is to be transmitted from the UAV 8, etc.), then that data is sent, from the first modulator 60, to the first data input/output 62. In this embodiment, if the demodulated signal comprises a UAV control signal, then that UAV control signal is sent, from the first modulator 60 to the first control signal input/output 64.

In this embodiment, as described in more detail later below with reference to FIG. 6, the first data input/output 62 is configured to receive data from the first demodulator 60, and send that received data to the communications management module 36.

Also in this embodiment, the first data input/output 62 is configured to receive information from the communications management module 36, and send that received information to the first waveform synthesiser 66.

In this embodiment, as described in more detail later below with reference to FIG. 6, the control signal input/output 64 is configured to receive a UAV control signal from the first demodulator 60, and send that received control signal to the mission systems module 32.

Also in this embodiment, the first control signal input/output 64 is configured to receive a transceiver control signal from the transceiver controller 58. The first transceiver 40 is configured to operate in accordance with a transceiver control signal received by the first control signal input/output 64

In this embodiment, the first waveform synthesiser 66 is configured to receive information from the first data input/output 62, and, using that received information, generate a waveform for transmission from the UAV 8.

The first waveform synthesiser 66 is configured to generate High Frequency (HF) RF waveforms. Similarly, each of the other waveform synthesisers (i.e. the waveform synthesisers of the other transceivers 42-56) is configured to generate waveforms of the relevant type. For example, the second waveform synthesiser is configured to generate V/UHF RF waveforms, the third waveform synthesiser is configured to generate L-band RF waveforms, and so on.

In this embodiment, the first waveform synthesiser 66 is connected to the waveform library 30 such that information stored in the waveform library may be acquired by the first waveform synthesiser 66. This acquired information is used by the first waveform synthesiser 66 to generate a waveform, as described in more detail later below with reference to FIG. 6.

Figure 5:
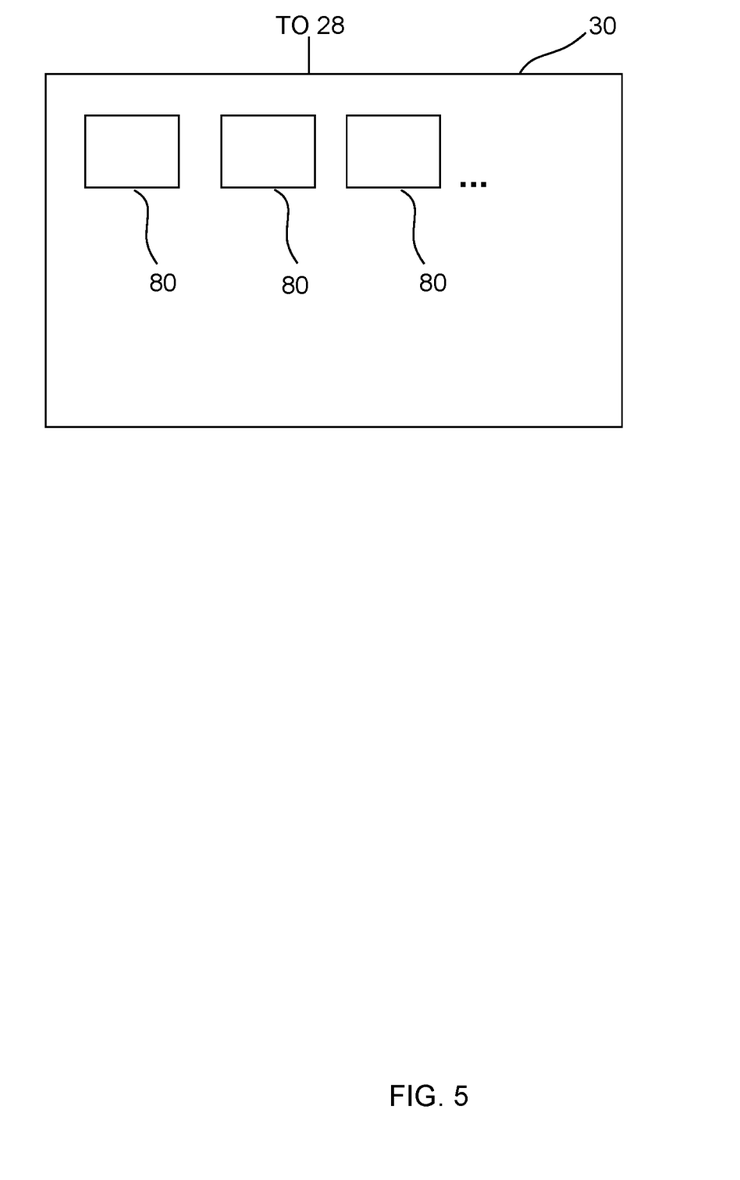
FIG. 5 is a schematic illustration (not to scale) of a waveform library.

FIG. 5 is a schematic illustration (not to scale) showing the waveform library 30.

In this embodiment, the waveform library 30 comprises a plurality of different waveform specifications 80.

In this embodiment, each waveform specification 80 specifies a different waveform for a transmission signal.

In this embodiment, the waveforms specified by the waveform specifications include, but are not limited to, an AM waveform, an L11 waveform, a STANAG 5066 waveform, an L22 waveform, an AM 8.33/25 kHz waveform, an FM 25/12.5 kHz waveform, a TACSAT (TACtical SATellite) waveform, a Maritime band waveform, an IDM waveform, a Guard Tac/Mar/V/U waveform, a JAPALS (Joint Precision Approach and Landing Systems) waveform, a CAMBS (Command Activated Mult Beam Sonar. Sonobuoy activation) waveform, an IFF (Interrogator Friend or Foe) waveform, a Link 16 waveform, an ADS-B waveform, a TACAN waveform (i.e. a TACtical Airborne Navigation waveform), a SATCOM waveform, a Data Link STANAG 7085 waveform, a DME (Distance Measuring Equipment) waveform, a GPS waveform, a Data Link STANAG 4660 waveform, an MLS (Microwave Landing System) waveform, a MADL (Multifunction Advanced Data Link) waveform, a SADL waveform, and an OFDM or COFDM (Coded Orthogonal Frequency Division Multiplexing) waveform.

The waveform chosen for a transmission signal may depend on the frequency band being implemented and/or any other appropriate criteria. A waveform may be selected as part of the UAV's pre-flight configuration. The selection of the waveform may depend on interoperability between the UAV 8 and other entities. The described system advantageously tends to be scalable.

In this embodiment, the waveform specifications 80 are stored in the waveform library 30 such that a waveform specification 80 may be acquired (e.g. retrieved) from the waveform library 30 by an appropriate waveform synthesiser of a transceiver (e.g. by the first waveform synthesiser 60 of the first transceiver 40). The waveforms specifications 80 may be used, by a waveform synthesiser, to generate a wave a waveform of that type. For example, the first waveform synthesiser 60 (which is an HF RF waveform synthesiser) may use a specification of an AM waveform, an L11 waveform, a STANAG 5066 waveform, or an L22 waveform to generate an HF RF AM waveform, an HF RF L11 waveform, an HF RF STANAG 5066 waveform, or an HF RF L22 waveform respectively. Also for example, the second waveform synthesiser (which is a V/UHF RF waveform synthesiser) may use a specification of an AM 8.33/25 kHz waveform, an FM 25/12.5 kHz waveform, a TACSAT waveform, a Maritime band waveform, an IDM waveform, a Guard Tac/Mar/V/U waveform, a JAPALS waveform, a CAMBS waveform, or an L22 waveform to generate a V/UHF RF AM 8.33/25 kHz waveform, a V/UHF RF FM 25/12.5 kHz waveform, a V/UHF RF TACSAT waveform, a V/UHF RF Maritime band waveform, a V/UHF RF IDM waveform, a V/UHF RF Guard Tac/Mar/V/U waveform, a V/UHF RF JAPALS waveform, a V/UHF RF CAMBS waveform, or a V/UHF RF L22 waveform waveform respectively.

In other embodiments, the waveform library 30 comprises a different set of waveform specifications that specify a different set of waveforms. For example, in other embodiments, the waveform library 30 includes a type of waveform specification instead of or in addition to one or more of those waveform specifications listed above.

Figure 6:
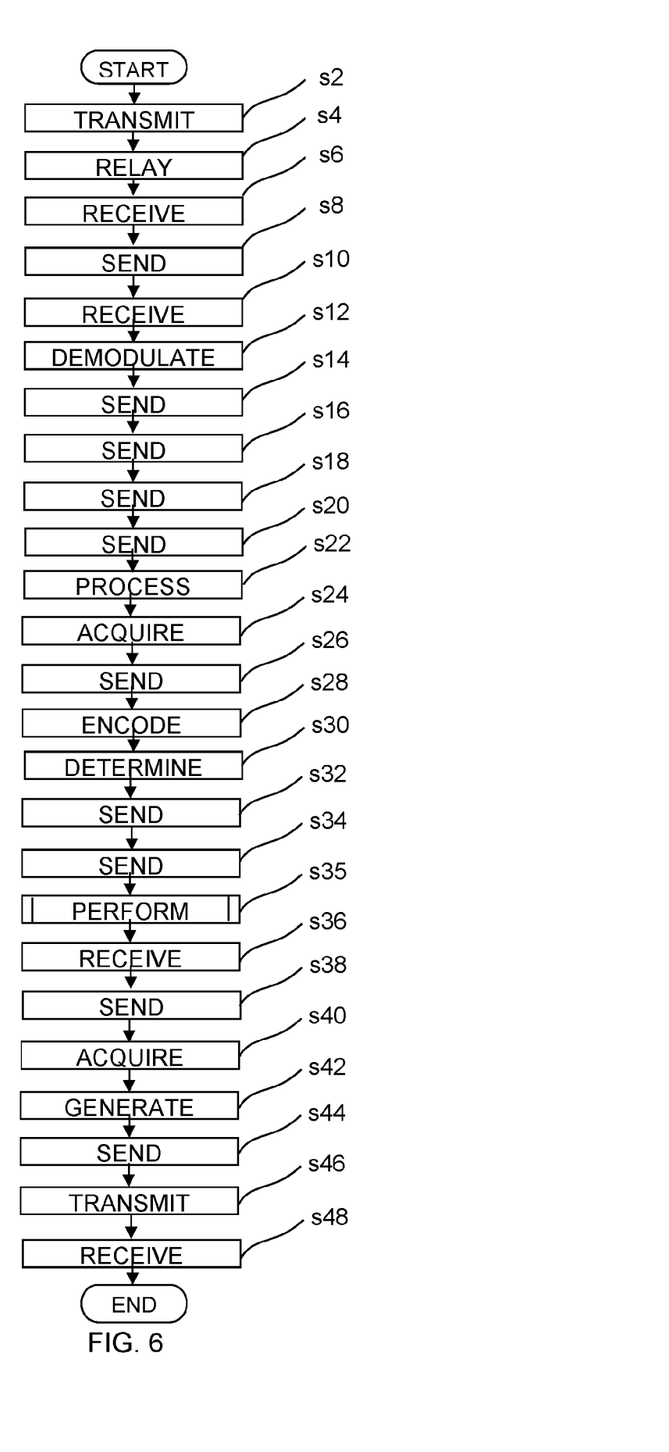
FIG. 6 is a process flowchart showing certain steps of a process performed by the entities in the scenario.

FIG. 6 is a process flowchart showing certain steps of a process performed by the entities in the scenario 2 shown in FIG. 1. The process of FIG. 6 comprises performing an embodiment of a communication management process.

At step s2, the ground station 4 sends a signal, via the first communications link 12, to the satellite 6.

In this embodiment, the signal sent from the ground station 4 to the satellite 6 is a SATCOM signal having a frequency in the X-band frequency range 8 GHz to 12 GHz. In other embodiments, a different type of signal which may have a different frequency may be sent.

Also, the signal sent from the ground station 4 to the satellite 6 includes a UAV control signal for the UAV 8. This UAV control signal includes an instruction for the UAV to send information, including altitude information, heading information, speed information, a position measurement, and an identifier, to the ATC station 10.

At step s4, the satellite 6 relays the SATCOM signal to the UAV 8 via the second communication link 14.

At step s6, the MF antenna 22 onboard the UAV 8 receives the SATCOM signal relayed by the satellite 6. In this embodiment, at this stage the MF antenna 22 is configured to receive at least SATCOM signals in the X-band frequency range.

At step s8, the SATCOM signal is sent from the MF antenna 22 to the transceiver module 28 via the distribution module 26.

In particular, in this embodiment, the SATCOM signal received by the MF antenna 22 is switched, by an optical switch of the distribution module 26, into an optical signal having a frequency corresponding to its destination (i.e. the sixth transceiver 50). This optical signal is then sent, via an optical fibre network, to the sixth transceiver 50 of the transceiver module 28.

Thus, the SATCOM signal having a frequency in the X-band frequency range is received by the X-band RF transceiver.

At step s10, the sixth transceiver 50 receives the SATCOM signal. In particular, in this embodiment, the demodulator of the sixth transceiver 50 (i.e. the sixth demodulator) receives the SATCOM signal. In this embodiment, as mentioned earlier above with reference to FIG. 6, the sixth demodulator is configured to receive and demodulate X-band signals.

At step s12, the sixth demodulator demodulates the received SATCOM signal so as to recover information from the modulated SATCOM signal.

In this embodiment, the UAV control signal that includes an instruction for the UAV 8 to send information (including altitude information, heading information, speed information, a position measurement, and an identifier) to the ATC station 10 is recovered, or extracted, from the modulated carrier signal.

At step s14, the sixth demodulator sends the recovered UAV control signal to the control signal input/output of the sixth transceiver 50 (i.e. the sixth control signal input/output).

At step s16, the sixth control signal input/output sends the control signal to the mission system module 32.

At step s18, the sixth demodulator sends data specifying the frequency band and the waveform of the received signal to the data input/output of the sixth transceiver 50 (i.e. the sixth data input/output). In other words, information specifying that the received signal is an X-band signal and has a SATCOM waveform is sent to the sixth data input/output.

At step s20, the sixth data input/output sends the data specifying the frequency band and the waveform of the received signal to the communications management module 36.

At step s22, the mission systems module 32 processes the control signal sent to it at step s16 to identify actions that are to be performed.

In this embodiment, the mission systems module 32 determines, using the control signal, that information including an altitude of the UAV 8, a heading of the UAV 8, a speed of the UAV 8, a position of the UAV 8, and an identifier of the UAV 8 is to be sent from the UAV 8 to the ATC station 10.

At step s24, the mission systems module acquires the information that is to be transmitted from the UAV 8 to the ATC station 10. The mission systems module 32 may acquire measurements or readings from the sensor module 34. For example, the mission systems module 32 acquire a measurement or reading from an altimeter, a compass, an airspeed sensor, and a GPS receiver that are included in the sensor module 34.

At step s26, the mission systems module 32 sends the acquired information to the communications control module 36.

At step s28, the communications control module 36 encodes the information received by the communications control module 36 from the mission system module 32.

At step s30, the communications control module 36 acquires (e.g. determines, selects, calculates, etc.) a frequency and a waveform with which the information encoded at step s28 is to be sent from the UAV 8 to the ATC ground station 10.

In this embodiment, the process of acquiring a frequency and a waveform for transmitting information (i.e. for the transmission signal) comprises, using the data specifying the frequency band and the waveform of the signal received by the UAV 8 that was sent to the communications management module 36 at step s20.

In this embodiment, the communications management module 36 selects a frequency from the set of frequencies that the transceivers 40-56 of the transceiver module 28 are capable of transmitting at. Also, the communications management module 36 selects a frequency (for a transmission signal) that is different to the frequency of the signal that is being received by the UAV 8. In other words, the communications management module 36 selects a frequency that is not in the X-band frequency range, and is within a frequency range that is capable of being transmitted by a transceiver 40-56. In particular, in this embodiment, communications management module 36 selects a frequency that is in the V/UHF RF range (i.e. between 30 MHz and 512 MHz).

In this embodiment, the communications management module 36 selects a waveform corresponding to a waveform specification 80 stored within the waveform library 30. Also in this embodiment, the communications management module 36 selects a waveform (for a transmission signal) that is different to the waveform of the signal that is being received by the UAV 8. In other words, the communications management module 36 selects a waveform that has a waveform specification 80 stored in the waveform library 30 and is different to the SATCOM waveform. In particular, in this embodiment, communications management module 36 selects an L11 waveform.

In other embodiments, the determination of a frequency and/or waveform performed at step s30 may be performed in a different manner. For example, in some embodiments, the signal received by the UAV 8 from the ground station 4 may specify a frequency and/or waveform for the transmission signal. The communications management module 26 may select, as the frequency/waveform for the transmission signal, that frequency/waveform specified in the signal received by the UAV 8 from the ground station 4.

At step s32, the communications management module 36 sends the information specifying the frequency and a waveform determined or selected at step s30 to the transceiver module 28.

In particular, in this embodiment the information specifying the frequency and a waveform is sent to the transceiver of the transceiver module 28 that is capable of transmitting a signal at a frequency equal to the frequency selected at step s30.

Thus, in this embodiment, the communications management module 36 sends the information specifying the frequency and a waveform for the transmission signal to the second transceiver 42 of the transceiver module 28 (which is configured to send and receive V/UHF RF signals, i.e. signals having a frequency in the range 30 MHz to 512 MHz).

At step s34, the communications management module 36 sends the encoded information (that was encoded at step s28) the transceiver of the transceiver module 28 that is capable of transmitting a signal at a frequency equal to the frequency selected at step s30, i.e. to the second transceiver 42.

At step s35, the communications management module 36 performs an interference reduction process.

The interference reduction process performed at step s35 is described in more detail later below with reference to FIG. 7.

At step s36, the data input/output of the second transceiver 42 (i.e. the second data input/output) receives the information specifying the frequency and a waveform for the transmission signal, and the encoded information that is to be transmitted.

At step s38, the second data input/output sends the information specifying the frequency and a waveform for the transmission signal, and the encoded information that is to be transmitted, to the second waveform synthesiser.

At step s40, the second waveform synthesiser acquires, from the waveform library 30, the waveform specification 80 that corresponds to the received the information. Thus in this embodiment, the second waveform synthesiser acquires, from the waveform library 30, a waveform specification 80 for an L11 waveform.

At step s42, using the acquired waveform specification 80, the second waveform synthesiser generates a transmission signal (i.e. a signal that is to be transmitted from the UAV 8).

In this embodiment, the transmission signal is a carrier signal for the encoded information that is to be transmitted, i.e. the encoded altitude of the UAV 8, heading of the UAV 8, speed of the UAV 8, position of the UAV 8, and identifier of the UAV 8. Also, the transmission signal has a waveform corresponding to the acquired waveform specification 80, i.e. an L11 waveform. Also, the transmission signal has a frequency equal to that selected by the communications management module at step s30, i.e. a frequency that is in the V/UHF RF range.

At step s44, the second waveform synthesiser sends, via the distribution module 26, the generated transmission signal to one of the antennas that is capable of transmitting that signal. In this embodiment, the transmission is sent to the LF antenna 20.

In particular, in this embodiment, the transmission signal sent by the second waveform synthesiser is switched, by an optical switch of the distribution module 26, into an optical signal. This optical signal is then sent, via the optical fibre network, to the LF antenna 20.

At step s46, the transmission signal is transmitted by the LF antenna 20, via the third communications link 16, to the ATC ground station 10. The transmission signal is transmitted as an L11 waveform at a frequency that is in the V/UHF RF range.

The frequency of the transmission signal has been selected (at step s30) to be different to the frequency of the signal being received at step s6. This advantageously tends to reduce interference between the transmitting and receiving communication channels.

Also, the waveform of the transmission signal has been selected (at step s30) to be different to the waveform of the signal being received at step s6. This advantageously tends to reduce interference between the transmitting and receiving communication channels.

Also, in some embodiments, the process performed at step s35 and described in more detail later below may be performed to reduce interference between the transmitting and receiving communication channels.

At step s48, the ATC ground station 10 receives and processes the signal transmitted from the LF antenna of the UAV 8.

Thus, a process performed by the entities of the scenario 2 is provided.

Returning now to step s35 of the process of FIG. 6, what will now be described is the interference reduction process performed by the communications management module 36.

Figure 7:
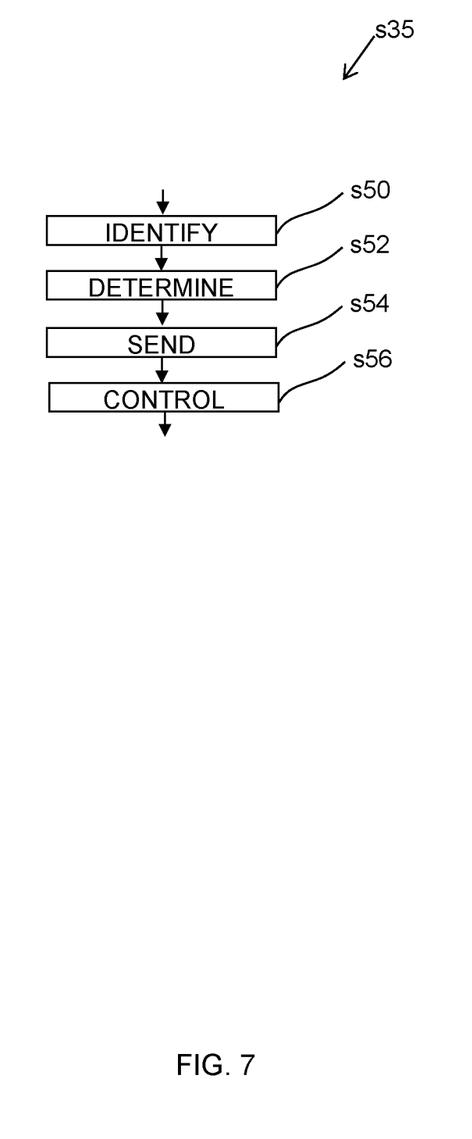
FIG. 7 is a process flow chart showing certain steps of an interference reduction process.

FIG. 7 is a process flow chart showing certain steps of the interference reduction process performed at step s35 of the process of FIG. 6.

At step s50, using the information specifying the frequency and a waveform for the transmission signal, the communications management module 36 identifies which of the receiving transceivers 40-56 onboard the UAV 8 may receive the transmission signal when it is transmitted from the UAV 8.

In this embodiment the transmission signal is to be an L11 waveform with a frequency in the V/UHF RE range (e.g. 30 MHz). Also, the transmission signal is to be transmitted by the second transceiver 42. In this embodiment, the communications management module 36 determines that the first transceiver 40 (i.e. an HF transceiver that is capable of receiving a 30 MHz signal) may receive the transmission signal when it is transmitted by the second transceiver 42.

At step s52, the communications management module 36 determines one or more actions that, if performed, would reduce co-site interference between the transceivers 40-56 identified at step s50 and the transceiver that is to transmit the transmission signal (i.e. the second transceiver 42).

In this embodiment, an action is to be performed by a transceiver 40-56.

In this embodiment, the communications management module 36 determines that the receive channel of the first transceiver 40 is to be desensitised so that signals having a frequency of 30 MHz are not received by the first transceiver 40.

At step s54, the communications management module 36 sends information specifying the determined actions to the transceiver controller 58.

Thus, in this embodiment, communications management module 36 sends, to the transceiver controller 58, information specifying that the first transceiver 40 is to be desensitised so that signals having a frequency of 30 MHz are not received by the first transceiver 40.

At step s56, the transceiver controller 58 controls, using transceiver control signals, the transceivers 40-56 so that the transceivers 40-56 operate as specified by the communications management module 36.

In this embodiment, the transceiver controller 58 controls the first transceiver 40 so as to desensitise the first transceiver 40.

Thus in this embodiment, the first transceiver 40 is desensitised so that signals having a frequency of 30 MHz are not received by the first transceiver 40. This may be performed, for example, by applying filters or de-sensitising the receiver RF channel, or in any other appropriate way.

Thus, co-site interference between the second transceiver 42 and the first transceiver 40 tends to be reduced. In other words, interference between the communications channels provided by the second transceiver 42 and the first transceiver 40 tends to be reduced.

In this embodiment, an action determined by the communications management module 36 at step s52 is to desensitise a transceiver 40-56.

In other embodiments, one or more of the determined actions may be a different type of action e.g. a different type of action that is to be performed by a transceiver. For example, the communications management module 36 may determine that the transmission power of the transmitting transceiver (i.e. the second transceiver 42 in this embodiment) is to be reduced to below a threshold value. This threshold power may, for example, be dependent upon a capability of a receiving antenna or channel.

In some embodiments, one or more of the determined actions may be an action that is to be performed by a different entity, e.g. an antenna 20, 22, 24, or any other entity onboard the UAV 8. In such embodiments, the actions determined by the communications management module 36 may be implemented by any appropriate apparatus.

For example, the communications management module 36 may determine that a receiving antenna that is capable of receiving the transmission signal is to be desensitised so that signals having a frequency of 30 MHz are not received by that receiving antenna. In such an embodiment, an antenna controller may be used to desensitise the receiving antenna so that it does not receive signals having a frequency of 30 MHz. Also for example, the communications management module 36 may determine that the transmitting antenna (i.e. the antenna that is to transmit the transmission signal) is to be steered away from a receiving antenna that is capable of receiving the transmission signal. Also for example, the communications management module 36 may determine that the transmission power of the transmitting antenna is to be reduced to below a threshold value. This threshold power may, for example, be dependent upon a capability of a receiving antenna or channel. Also for example, the communications management module 36 may select as the transmitting antenna, an antenna that is spatially separated on the UAV 8 from a receiving antenna that is capable of receiving the transmission signal. Also for example, the communications management module 36 may determine a time period in which the transmission signal is to be transmitted by the transmitting antenna. This time period may, for example, be a time period in which a receiving antenna that is capable of receiving the transmission signal can be deactivated or desensitised.

In this embodiment, the action determined by the communications management module 36 is to reduce interference between a communication channel via which a signal is being transmitted (i.e. the communication channel provided by the second transceiver 42) and a communication channel via which a signal may be received (i.e. the communication channels provided by the first transceiver 40). However, in other embodiments, the action determined by the communications management module 36 is to reduce interference between different communication channels. For example, in some embodiments, the action determined by the communications management module 36 is to reduce interference between two transmitted signals, each of which is transmitted via a different respective communication channel. Such an action may, for example, comprise controlling one or more of the transceivers that transmission of those signals does not occur simultaneously. For example, the transmission of one or the signals may be delayed with respect to the transmission of the other signal so that the signal transmissions do not overlap to any extent temporally. This tends to reduce interference between two transmitted signal, and tends to be particularly useful when the frequency ranges of the transmission signals overlap to some extent.

An advantage provided by the above described system and method a process is that the detrimental effects of receiver desensitisation caused by a receiver antenna being in the vicinity of a transmitter antenna tend to be reduced or alleviated.

Thus, the use of a plurality of transmitting and receiving co-site antennas tends to be facilitated. Furthermore, the need for increasing antenna isolation by means of platform re-design tends to be reduced or eliminated.

The size, weight and power requirements of the above described system tend to be significantly lower than in conventional systems. This tends to provide that the system is useable in a large number of different situations. For example, the system tends to be useable in a variety of air vehicles (e.g. UAVs), marine and land vehicles. Moreover, the provided system advantageously tends to be useable on vehicles with which conventional filtering systems may not be used, e.g. vehicles in which space, weight, and/or cost restrictions would prohibit the use of conventional filtering systems.

A further advantage provided by the above described system and method is that the system is modular. This tends to provide that any transceiver module in the vehicle may be updated, replaced, or changed independently of the other modules in the vehicle.

A further advantage provided by the above described system and method is that the adaptive management of transceivers/antennas tends to enhance receiver performance by improving RF isolation.

Advantageously, the above described waveform library is a centralised library of waveform specification that is accessible by each of the transceivers. Thus, the use of individual waveform libraries for each of the transceivers tends to be avoided. Furthermore, the waveform library is scalable. New or updated waveforms specifications can be easily added to the centralised waveform library. These new waveform specifications will tend to be accessible by all of the transceivers. Similarly, obsolete waveforms specifications can be easily removed from the centralised waveform library.

Advantageously, the above described transceiver module, in effect, provides a transceiver that is capable of operating in a plurality of different RF bands. In other words, the transceiver module provide a plurality of different communication channels via which RF signals may be sent and received. Furthermore, the transceiver module is scalable. New or updated transceivers can be easily added to the transceiver module. Similarly, obsolete transceiver modules can be easily removed from the transceiver module.

Advantageously, the above described transceiver module tends to provide that the plurality of transceivers may be housed in a common housing. Thus, having a separate housing for each of the transceivers tends to be avoided. This advantageously tends to facilitate in the reduction of a size and/or weight of a vehicle.

Advantageously, in the above described system, a separate antenna for each respective transceiver in the transceiver module tends not to be used. In particular, a plurality of different transceivers may transmit and/or receive a signal via the same antenna. This advantageously tends to reduce the number of antennas on a vehicle, thereby reducing the likelihood of co-site interference. Also, this advantageously tends to facilitate in the reduction of a size, weight, and/or power requirement of a vehicle.

The above described distribution module advantageously provides that signals are distributed between the antennas and the transceiver module via an optical fibre network. The optical fibre network tends to provide a relatively large bandwidth compared to, for example, a network of copper wires. Also, use of the optical fibre network tends to result in less signal noise, and lower signal losses compared to using, for example, a network of copper wires. Also, use of the optical fibre network tends to reduce electromagnetic compatibility issues compared to using, for example, a network of copper wires.

Advantageously, in the above described system, a transceiver controller for each respective transceiver in the transceiver module tends not to be used. In particular, a plurality of different transceivers may be controlled by the same controller. This advantageously tends to facilitate in the reduction of a size, weight, and/or power requirement of a vehicle.

Advantageously, the above described system tends to be scalable. For example, synthesisers may be added to or subtracted from the above described system depending on user requirements and/or the antenna frequency bounds.

Apparatus, including the communications management module, for implementing the above arrangement, and performing the method steps to be described later below, may be provided by configuring or adapting any suitable apparatus, for example one or more computers or other processing apparatus or processors, and/or providing additional modules. The apparatus may comprise a computer, a network of computers, or one or more processors, for implementing instructions and using data, including instructions and data in the form of a computer program or plurality of computer programs stored in or on a machine readable storage medium such as computer memory, a computer disk, ROM, PROM etc., or any combination of these or other storage media.

It should be noted that certain of the process steps depicted in the flowchart of FIG. 6 and described above may be omitted or such process steps may be performed in differing order to that presented above and shown in FIG. 6. Furthermore, although all the process steps have, for convenience and ease of understanding, been depicted as discrete temporally-sequential steps, nevertheless some of the process steps may in fact be performed simultaneously or at least overlapping to some extent temporally.

In the above embodiments, method of communication management is implemented in the scenario described above with reference to FIG. 1. However, in other embodiments, the method of communication management is implemented in a different scenario. For example, the method may be implemented in a scenario comprising a different number of ground stations, a different number of satellites, a different number of UAVs, and/or a different number of ATC stations. For example, in some embodiments a ground station communicates directly with a UAV (e.g. via a line-of-sight communication link) and no satellites are used.

In the above embodiments, method of communication management is implemented to control the receiving/transmission of communications to/from a UAV. However, in other embodiments the method is implemented on a different type of vehicle. For example, in other embodiments the method is implemented on a manned aircraft, or a manned or unmanned land-based or water-based vehicle. Also, in other embodiments, the method may be implemented on a different type of entity other than a vehicle, e.g. a building.

In the above embodiments, the UAV comprises three antennas, each being configured to receive a different range of RF frequencies. However, in other embodiments the vehicle comprises a different number of antennas. For example, In some embodiments, the vehicle may comprise a single ultra wideband antenna that allows a plurality of transceiver to operate simultaneously.

In the above embodiment, the distribution module comprises an optical fibre network. However, in other embodiments, a different type of distribution module may be implemented to allow signals to travel between an antenna and a transceiver. For example, a copper wire network may be used instead of or in addition to the optical fibre network.

In the above embodiment, the transceiver module comprises nine transceivers which are described in more detail earlier above with reference to FIG. 3. However, in other embodiments, the transceiver module comprises a different number of transceiver modules. Also, in other embodiments, the transceiver module comprises one or more different type of transceiver instead of or in addition to one or more of the types of transceiver described above with reference to FIG. 3. Also, in some embodiments, the transceiver module may comprise a receiver or a transmitter instead of or in addition to a transceiver.

In the above embodiments, RF signals are received by the antennas and processed by the systems onboard the UAV. However, in other embodiments one or more of the antennas may be arranged to receive and/or transmit a different type of signal. Also, the systems onboard the UAV may be arranged to process a different type of signal.

In the above embodiments, the transceivers within the transceiver module are controlled by a common transceiver controller. However, in other embodiments, the transceivers may not be controlled by a common transceiver controller; for example, each transceiver may be controlled by separate transceiver controller.

What is claimed is:

1. A method of receiving and transmitting radio frequency signals by a vehicle (8), the method comprising:
   providing a transceiver module (28), the transceiver module (28) being located onboard the vehicle (8), the transceiver module (28) comprising a plurality of transceivers (40-56), each transceiver (40-56) being configured to operate within a different respective radio frequency band;
   providing a waveform library (30) containing a plurality of different waveform specifications (80), the waveform library (30) being located onboard the vehicle (8);
   receiving, by a first transceiver of the transceiver module (28), a first radio frequency signal having a first frequency and a first waveform, the first frequency being a frequency within a first radio frequency band, the first radio frequency band being a band within which the first transceiver is configured to operate;
   determining, using the first frequency, by a communications management module (36) located onboard the vehicle (8) and operatively coupled to the transceiver module (28), a second frequency, the second frequency being different to the first frequency and being within a second radio frequency band that is different to the first radio frequency band;

selecting, using the first waveform, by the communications management module (36), a second waveform corresponding to one of the plurality of waveform specifications (80) stored in the waveform library (30), the second waveform being different to the first waveform;

acquiring, by a waveform synthesiser, from the waveform library (30), a waveform specification (80) for the second waveform;

synthesising, by the waveform synthesiser (66), using the acquired waveform specification (80) for the second waveform, a signal having the second frequency and the second waveform; and transmitting, by a second transceiver of the transceiver module (28) configured to operate within the second radio frequency band, the synthesised signal;

wherein the second frequency and the second waveform are chosen so as to minimize receiver desensitization.

2. The method according to claim 1, wherein the first radio frequency band does not overlap to any extent with the second radio frequency band, thereby providing that the second radio frequency signal is not received by the first transceiver.

3. The method according to claim 1, wherein the step of transmitting and the step of receiving overlap at least to some extent temporally.

4. The method according to claim 1, wherein:
the first transceiver receives the first radio frequency signal via a receiver antenna (20, 22, 24);
the method further comprises selecting, by the communications management module (36), as a transmission antenna (20, 22, 24), an antenna (20, 22, 24) that is a different antenna (20, 22, 24) to the receiver antenna (20, 22, 24);
the step of transmitting the second radio frequency signal is performed via the transmission antenna (20, 22, 24); and
the receiver antenna (20, 22, 24) and the transmission antenna (20, 22, 24) are located onboard the vehicle (8).

5. The method according to claim 1, wherein,
the first transceiver receives the first radio frequency signal via a receiver antenna (20, 22, 24);
the second transceiver transmits the second radio frequency signal via a transmission antenna (20, 22, 24);
the receiver antenna and the transmission antenna (20, 22, 24) are located onboard the vehicle (8); and
the receiver antenna (20, 22, 24) is the same antenna as the transmission antenna (20, 22, 24).

6. The method according to claim 1, the method further comprising:
receiving, by a third transceiver of the transceiver module (28), a third radio frequency signal; and
controlling, so as to reduce interference in the received third radio frequency signal caused by the transmission of the second radio frequency signal, by a control module, an operation of one or more entities selected from a group of entities consisting of: the second transceiver, the third transceiver, and an antenna (20, 22, 24) from which the second radio frequency signal is being transmitted, the antenna being located onboard the vehicle (8).

7. The method according to claim 6, wherein the step of controlling comprises controlling the apparatus so as to perform one or more actions selected from the group of actions consisting of:
reducing a sensitivity to the second radio frequency signal of the third transceiver;
reducing a sensitivity to the second radio frequency signal of an antenna (20, 22, 24) at which the third radio frequency signal is received;
reducing a transmit power with which the second radio frequency signal is transmitted; and
steering the antenna (20, 22, 24) from which the second radio frequency signal is transmitted so that the second radio frequency signal is directed away from the antenna (20, 22, 24) at which the third radio frequency signal is received.

8. The method according to claim 1, the method further comprising:
transmitting, by a fourth transceiver of the transceiver module (28), a fourth radio frequency signal; and
controlling, so as to reduce interference between the second radio frequency signal and the fourth radio frequency signal, by a control module, an operation of one or more entities selected from a group of entities consisting of: the second transceiver, the fourth transceiver, an antenna (20, 22, 24) from which the second radio frequency signal is being transmitted, and an antenna (20, 22, 24) from which the fourth radio frequency signal is being transmitted.

9. The method according to claim 8, the step of controlling is performed such that the transmission of the second radio frequency signal and the transmission of the fourth radio frequency signal do not overlap to any extent temporally.

10. Apparatus for receiving and transmitting radio frequency signals by a vehicle (8), the apparatus being located onboard the vehicle, the apparatus comprising:
a transceiver module (28) comprising a plurality of transceivers (40-56), each transceiver (40-56) being configured to operate within a different respective radio frequency band;
a waveform library (30) containing a plurality of different waveform specifications (80);
a communications management module (36); and
a waveform synthesiser; wherein
a first transceiver of the transceiver module (28) is configured to receive a first radio frequency signal having a first frequency and a first waveform, the first frequency being a frequency within a first radio frequency band, the first radio frequency band being a band within which the first transceiver is configured to operate;
the communications management module (36) is configured to:
determine, using the first frequency, a second frequency, the second frequency being different to the first frequency and being within a second radio frequency band that is different to the first radio frequency band; and
select, using the first waveform, a second waveform corresponding to one of the plurality of waveform specifications (80) stored in the waveform library (30), the second waveform being different to the first waveform;
the waveform synthesiser is configured to acquire, from the waveform library (30), a waveform specification (80) for the second waveform, and to synthesise, using the acquired waveform specification (80) for the second waveform, a signal having the second frequency and the second waveform; and a second transceiver of the transceiver module (28) is configured to operate within the second radio frequency band, and to transmit the synthesised signal;

wherein the second frequency and the second waveform are chosen so as to minimize receiver desensitization.

11. An aircraft comprising apparatus according to claim 10.

12. A machine readable non-transitory storage medium storing a program or plurality of programs arranged such that when executed by a computer system or one or more processors it/they cause the computer system or the one or more processors to operate in accordance with the method of claim 1.

\* \* \* \* \*